United States Patent [19]

Yamamoto et al.

[11] Patent Number: 4,797,527
[45] Date of Patent: Jan. 10, 1989

[54] ELECTRODE FOR ELECTRIC DISCHARGE MACHINING AND METHOD FOR PRODUCING THE SAME

[75] Inventors: Kenji Yamamoto; Takehisa Nakayama; Yoshihisa Tawada, all of Kobe, Japan

[73] Assignee: Kanegafuchi Kagaku Kogyo Kabushiki Kaisha, Osaka, Japan

[21] Appl. No.: 825,288

[22] Filed: Feb. 3, 1986

[30] Foreign Application Priority Data

Feb. 6, 1985 [JP] Japan .................................. 60-21403
Nov. 5, 1985 [JP] Japan .................................. 60-247464

[51] Int. Cl.$^4$ .......................... B23H 1/04; B05D 3/06
[52] U.S. Cl. ...................................... 219/69 E; 427/39
[58] Field of Search ............ 427/39; 219/69 E, 69 W, 219/121 PG; 204/192.22, 192.23, 192.15, 280

[56] References Cited

U.S. PATENT DOCUMENTS

| | | | |
|---|---|---|---|
| 2,886,502 | 5/1959 | Holland | 204/192.22 |
| 3,336,213 | 8/1967 | Auger et al. | 204/224 M |
| 4,057,661 | 11/1977 | Züst | 204/192.22 |
| 4,134,807 | 1/1979 | Briffod | 219/69 M |
| 4,168,330 | 9/1979 | Kaganowicz | 427/39 |
| 4,231,816 | 11/1980 | Cuomo et al. | 204/192.15 |
| 4,234,622 | 11/1980 | DuBuske et al. | 204/192.15 |
| 4,235,662 | 11/1980 | Reitz | 204/192.15 |
| 4,339,270 | 7/1982 | Hashimoto et al. | 204/293 |
| 4,341,939 | 7/1982 | Briffod et al. | 219/69 W |
| 4,446,168 | 5/1984 | Kato et al. | 427/39 |
| 4,452,828 | 6/1984 | Namba et al. | 427/39 |
| 4,532,150 | 7/1985 | Endo et al. | 427/39 |
| 4,564,533 | 1/1986 | Yamazaki | 427/39 |
| 4,628,170 | 12/1986 | Furukawa | 219/69 D |
| 4,640,744 | 2/1987 | Howe | 204/294 |
| 4,668,365 | 5/1987 | Foster et al. | 204/192.23 |

FOREIGN PATENT DOCUMENTS

| | | | |
|---|---|---|---|
| 1061005 | 7/1959 | Fed. Rep. of Germany | 219/69 E |
| 2745124 | 4/1978 | Fed. Rep. of Germany | |
| 3424958 | 1/1985 | Fed. Rep. of Germany | 219/69 W |
| 52-17339 | 2/1977 | Japan | 427/39 |
| 223526 | 12/1983 | Japan | 219/69 E |
| 59-14429 | 1/1984 | Japan | 219/69 W |
| 403525 | 3/1974 | U.S.S.R. | 219/69 E |
| 846211 | 7/1981 | U.S.S.R. | 219/69 E |
| 1454146 | 10/1976 | United Kingdom | |
| 2078699 | 1/1982 | United Kingdom | 427/39 |

Primary Examiner—A. D. Pellinen
Assistant Examiner—Geoffrey S. Evans
Attorney, Agent, or Firm—Armstrong, Nikaido, Marmelstein & Kubovcik

[57] ABSTRACT

An electrode for electric discharge machining wherein at least a part of the surface of the electrode is coated with a non-single crystalline insulator to prevent undesirable electric discharge between the electrode and a workpiece. The electrode may also have a coating of a buffer material formed from a metal having a small thermal expansion coefficient or from an amorphous material, in which case the exterior coat is a hard insulator with a Vickers hardness of at least 1000 coated on the buffer. A process for the production of these electrodes using plasma discharge methods is also described.

15 Claims, 3 Drawing Sheets

FIG. 1
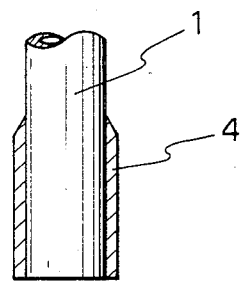
FIG. 2
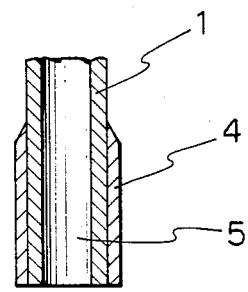
FIG. 3(A)      FIG. 3(B.)
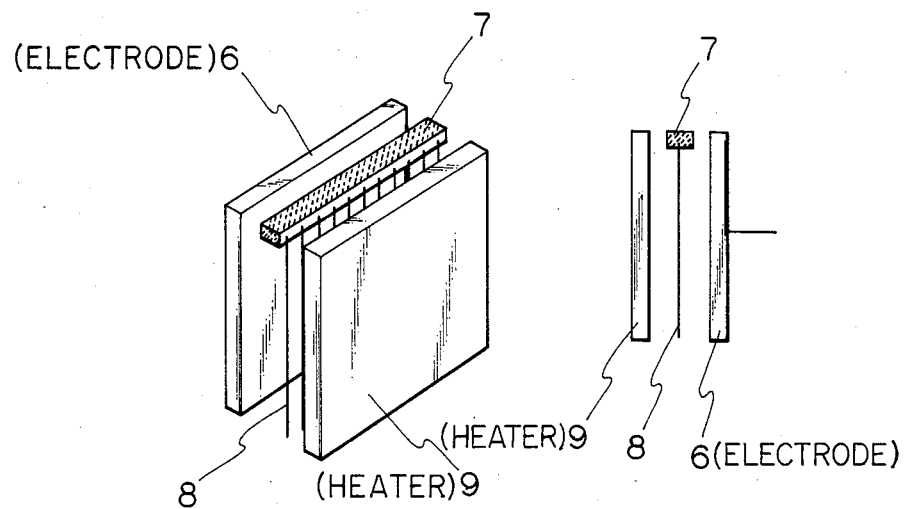

ELECTRODE FOR ELECTRIC DISCHARGE MACHINING AND METHOD FOR PRODUCING THE SAME

BACKGROUND OF THE INVENTION

The present invention relates to an electrode for electric discharge machining of which working characteristics are improved and a method for producing the same.

Hitherto, there have been employed, as electrodes for electric discharge machining, electrodes made of brass, copper, silver-tungsten, graphite, alminium, molybdenum, tungsten, mild steel, zinc alloy, and the like.

In case of carrying out electric discharge machining using the above-mentioned electrodes, there is provided space of about 0.2 to 0.6 mm between the electrode and a workpiece. Direct pulse current is applied to the electrode in order to obtain arc discharge between the electrode and the workpiece. The surface of the workpiece is cut by means of heat and pressure caused by arc discharge. In the case of making a hole, the electric discharge machining is carried out using an hollow electrode for electric discharge machining of which outer diameter is about 0.2 to several mm, and supplying working liquid to the workpiece if necessary.

However, in case of using a conventional electrode as shown in FIG. 7, an electric discharge occurs between not only an end portion 2 but also a side portion 3 of an electrode 1 for electric discharge machining and a workpiece, whereby there are caused problems that dimensional accuracy during the working becomes worse and it becomes difficult to perform uniform electric discharge machining for a long time because of exhaustion of the side portion 3 of the electrode 1. In case of making a hole on or grooving the surface of the workpiece, particularly, as the depth of the hole or groove becomes deeper there increases undesirable discharge between the side portion of the electrode and the side of a hole or groove made on the surface of the workpiece, which makes the above-mentioned problems more serious.

There has been a method to coat a part of an electrode with single crystal such as $SiO_2$ or $SiC$ in order to remove the above-mentioned problems with respect to electrodes for electric discharge machining. According to this method, however, the electric discharge at the side portion of an electrode cannot be sufficiently avoided due to drawbacks that the thickness of single crystal coated is limited and the strain caused by the heat generates craking within single crystal.

The object of the present invention is to provide an electrode for electric discharge machining which improves the dimensonal accuracy during the process of electric discharge machining and extends the life of the electrode, and a method for producing the same.

SUMMARY OF THE INVENTION

According to the present invention, there is provided an electrode for electric discharge machining wherein at least a part of the electrode is coated with non-single crystalline insulator whereby working characteristics are improved. The undesirable electrode discharge which occurs during the electric discharse machining at the side, for example, of the electrode for electric discharge machining is prevented by coating a non-single crystalline insulator on the side portion of the electrode.

According to the present invention, there is provided another electrode for electric discharge machining wherein at least a part of an electrode is coated with a buffer material comprising a metal having small thermal expansion coefficient or an amorphous material and wherein a hard insulator having surface Vickers hardness of not less than 1000 is further coated on the buffer material, and a method for producing the electrode coated with hard insulator characterized in that the hard insulator having surface Vickers hardness of not less than 1000 is coated on the buffer material by means of employing a mixed method of DC discharge plasma CVD method and RF discharge plasma CVD method wherein negative high voltage is applied to the electrode itself at least a part of which is coated with buffer material comprising a metal having small thermal expansion coefficient or amorphous material

BRIEF EXPLANATION OF THE DRAWINGS

FIGS. 1 and 2 are sectional views explaining different embodiments of an electrode for electric discharge machining of the present invention;

Figs. 3 (a) and 3 (b) are views explaining a method of coating a surface of the electrode for electric discharge machining with insulator;

DETAILED DESCRIPTION

Figure 4:
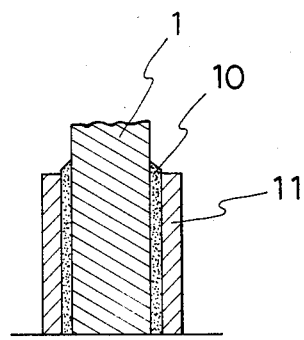
FIG. 4 is a sectional view explaining another embodiment of an electrode for electric discharge machining of the present invention.

In the present invention, there can be employed electrodes comprising copper, brass, aluminum zinc alloy, carbon, graphite, tungsten, silver-tungsten, molybdenum, mild steel, and the like, and used for making a hole, grooving or patterning a metal, and the like. Such electrodes are cylindrical or prismatic of whicn size is, for example, 1 mm×0.3 mm×200 mm. The electrodes used in the present invention, however, are not limited to those described above and any electrodes employable as usual electrodes for electric discharge machining can be used in the present invention. The description of 1 mm×0.3 mm×200 mm means that an outer diameter of a hollow electrode is 1 mm, an inner diameter is 0.3 mm and a length of the electrode is 200 mm.

In the present invention, at least a part of an electrode 1 for electric discharge machining is coated with non-single crystalline insulator 4 as shown in FIG. 1 or 2 wherein the thickness of coating is preferably about 0.5 to 50 μm, more preferably 1 to 10 μm. Numeral 5 in FIG. 2 shows a hollow portion formed within the electrode 1 for electric discharge machining.

In case that the above-mentioned thickness of the coating is less than about 0.5 μm, it is difficult to obtain sufficient insulation and accordingly electric discharge is apt to occur at such places that have poor insulation property. On the other hand, in case that the thickness of the coating is more than about 50 μm, there is apt to occur a peeling of the coating or crack due to internal strain. In the case that the thickness of the coating is particularly within the range of 1 to 10 μm, perfect insulation property can be obtained and neither cracking or peeling occurs.

Examples of the above-mentioned non-single crystalline insulator are, for instance, amorphous insulators including amorphous or microcrystalline insulators made of a material containing at least one element of Groups IVA and IVB of periodic table, material containing at least one element selected from hydrogen and halogen group elements or a material of III–V group such as BP, BN and AlN.

Concrete examples of non-single Group IV of insulators including at least one element of IV group of periodic table are, for instance, amorphous material containing amorphous or microcristal which includes at least one material selected from Si, C, $Si_xC_{l-x}$, $Si_xN_{l-x}$, $Si_xO_{l-x}$, $Si_{x+y}C_{l-x}N_{l-y}$, $Si_{x+y}C_{l-x}O_{l-y}$, $Si_{x+y}O_{l-x}N_{l-y}$, $Si_{x+y}C_{1-x}Ge_{l-y}$, $C_xGe_{l-x}$ (wherein x and y satisfy the relationship of $0.01 \leq x \leq 1$ and $0.01 \leq x+y \leq 1$) and material containing besides the above-mentioned amorphous material at least one element selected from hydrogen and halogen group elements.

Among above-mentioned non-single crystalline insulator, there are preferably employed, from the point of insulation property, a material containing C or Si, particularly a—C, a—Si, a—$Si_xC_{l-x}$, a—$Si_xN_{l-x}$, a—$Si_xO_{l-x}$ (wherein x satisfies the relationship of $0.1 \leq x \leq 0.9$) containing amorphous or microcrystal, a material containing element of III or V group of periodic table by 0.001 to 2 atm % in total weight besides the above-mentioned material, or a—$Si_{x+y}O_{l-x}N_{l-y}$, a—$Si_{x+y}C_{l-x}N_{l-y}$ (wherein x and y satisfy the relationship of $0.1 \leq x+y \leq 0.9$).

In order to prevent the electric discharge at undesired portion of an electrode for electric discharge machining, for example at portions other than the end portion 2 in FIG. 3, conductivity (specific conductances) and withstand breakdown vogltage, of the non-single crystal insulator are in general preferably not more than $10^{-10}$ $(\Omega \cdot cm)^{-1}$ and not less than 20 V/$\mu$m respectively, more preferably not more than $10^{-11}$ $(\Omega \cdot cm)^{-1}$ and not less than 40 V/$\mu$m, which vary corresponding to the thickness of the non-single crystalline insulator coated on the above-mentioned undesired portions.

The coating preferably includes not more than 30 atm % of, more preferably 0.1 to 20 atm % of such atoms that terminate with a dangling bond, for example an atom or atoms comprising at least one element selected from hydrogen and halogen group elements in order to obtain the non-single crystalline insulator having the above-mentioned conductivity and withstand voltage. The coating further might include not more than 5 atm % of rare gas such as Ar and He.

Figure 7:
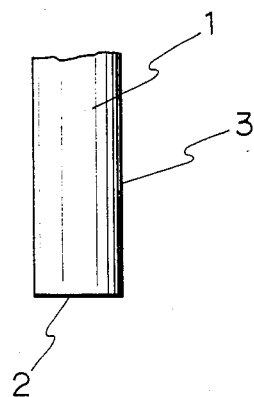
FIG. 7 is a view explaining a conventional electrode for electric discharge machining.

A description of "a part of an electrode for electric discharge machining coated with non-single crystalline insulator" in the present invention means, for instance, a part which excludes the end portion 2 of the electrode in FIG. 7 and a portion of the electrode connected to a power source. It is not always required to coat all of the above-mentioned part with non-single crystalline insulator. The electrode should be coated in such a manner that there undesired electric discharge does not occur between the electrode and the workpiece during the electric discharge machining. A concrete example of a part coated with non-single crystalline insulator is, for example, a side portion of the electrode for electric discharge machining shown in FIGS. 1 and 2. The coating of the end portion 2 does not cause any problem in practice since dielectric breakdown occurs in the coating due to the initial electric discharge.

Referring now to an embodiment, a method for producing an electrode of the present invention is explained.

After shielding a portion of the electrode connected to a power source and an end portion of the electrode in order not to coat these portions with non-single crystalline insulator, a layer of non-single crystalline insulator is formed by means of usual RF (radio frequency) glow discharge decomposition method, DC (direct current) glow discharge decomposetion method, arc discharge glow decomposition method, microwave discharge decomposition method, photo CVD method using infrared light, photo CVD method using ultraviolet light, and the like. On forming a layer of non-single crystalline insulator, it is preferable that the coating step is carried out under reduced pressure at a degree of 10 to 0.001 Torr in order to form a uniform coating. The coating step is generally carried out at a temperature of not more than 1000° C. It is particularly preferable that the coating step is carried out at a temperature of not more than 500° C. so as to decrease strain in the coating formed, prevent a layer of crystal from growing in excess of the desired thickness and include a bond terminator in the coating.

In order to increase the hardness of the coating, there might be formed on the electrode i-C, diamond, a-SiC, BN, AlN, TiN, and the like setting the electrodes to be negative potential to utilize collision energy of accelerated ion, and there might also be formed SiO, AlN, BN, BP, and the like employing heat CVD method with the help of catalyst, whereby there can be preferably obtained coatings which are fine, superior in insulation property and wear resistance.

It is preferable that the non-single crystalline insulator employed in the present invention has high thermal conductivity in addition to superior insulation property, small electric conductivity and high withstand voltage. Examples of material having high thermal conductivity are, for example, SiC, BN, diamond-like carbon.

According to the present invention, there is provided another electrode for electric discharge machining wherein at least a part of the electrode is coated with a coating layer comprising buffer material (referred as buffer layer hereinafter), and a coating comprising hard insulator (referred as hard insulation coating) is further coated on the buffer layer.

A description of "at least a part of the electrode for electric discharge machining" means at least a part of the electrode which approaches to a workpiece. The ratio of the part to all surface of the electrode is not limited. The part might be all of the surface of the electrode, or it might be only a used portion of the electrode (i.e. a portion which approaches to a workpiece).

The above-mentioned buffer layer is provided in order to remove such problems that the hard insulation coating cannot generally be formed directly on the electrode for electric discharge machining, and even if the hard insulation coating is managed to be formed, the coating is apt to peel off due to a large difference of thermal expansion coefficient between these two materials, and the strain caused by heat or crack are apt to occur. In case of forming hard insulation coating employing a plasma CVD method, the temperature of an electrode for electric discharge machining rises due to collision of hydrogen ion in, plasma. The above-mentioned buffer layer also prevents the peeling of hard insulation coating having small thermal expansion coefficient such as silicon carbide away from the electrode for electric discharge machining having large thermal expansion coefficient, wherein the peeling is caused by the rise of temperature of the electrode. The buffer layer further prevents the generation of sputtering due to collision of ion, particularly hydrogen ion. The generation of the above-mentioned sputtering disturbs the deposit of coating since sputtering prevails over the deposit of the coating in the case of using such electrodes that comprise copper, alminium, brass, and the like having large sputtering ratio.

Examples of buffer material of the present invention are, for example, metals such as Mo, Nb, Pt, Ti, Cr, Ir, W, stainless steel having small thermal expansion coefficient at a temperature from room temperature to 500° C., preferably of not more than $15 \times 10^{-6}/K$, more preferably of not more than $10 \times 10^{-6}/K$; amorphous material such as amorphous silicon compound, other amorphous compound, and the like wherein amorphous silicon compound are, for example, a—Si, a—$Si_xC_{l-x}$, a—$Si_xN_{l-x}$, a—$Si_{x+y}C_{l-x}N_{l-y}$, a—$Si_{x+y}C_{l-x}O_{l-y}$, a—$Si_{x+y}C_{l-x}Ge_{l-y}$, a—$C_xGe_{l-x}$ (wherein x and y satisfy the relationship of $0.01 \leq x \leq 1$, $0.01 \leq x+y \leq 1$); and the above-mentioned amorphous material which includes at least one element selected from hydrogen and halogen group elements. The buffer material is, of course, not limited to these examples. Among the above-mentioned metals having small thermal expansion, metals such as Mo and W having small sputtering ratio against hydrogen ion are preferably used.

The thickness of the buffer layer of the present invention is preferably 50 Å to 5 μm, more preferably 500 Å to 3 μm.

In case that the thickness of the buffer layer is less than 50 Å, it becomes impossible to relax, for example, the strain caused by the difference of thermal expansion coefficient between the above-mentioned two material, that is to say the electrode and hard insulator, or to obtain sufficient effect to prevent sputtering during the formation of the hard insulation coating, whereby the desired hard insulation coating cannot be obtained. On the other hand, in case that the thickness of the buffer layer is more than 5 μm, the hardness thereof is likely to influence the hardness of the hard insulation coating. Sputtering method, Electron-beam vacuum evaporation coating method, and the like are employable in forming the above-mentioned buffer layer from metal material.

In case of forming the buffer layer from amorphous silicon compound, it is preferable to use the amorphous silicon compound that is produced in accordance with the mixed method of DC dischange plasma CVD mehtod and RF discharge plasma CVD method in which negative voltage is applied to the electrode in order to form a coating superior in wear resistance and having high hardness on the buffer layer. Among the above-mentioned amorphous silicon compounds, amorphous silicon carbide is more preferable.

The amorphous silicon carbide is used not only as a buffer layer but also as a hard insulation coating. In case of using amorphous silicon carbide as a buffer layer, there can be suitably used a material which includes much silicon and hydrogen therein and has surface Vickers hardness of not more than 1500. On the other hand, in case of using as hard insulation coating, there can be suitably used a material which includes not more than 20 atm % of hydrogen therein and has surface Vickers hardness of not less than 1500.

The buffer layer made from amorphous silicon compound has flexible structure, structural flexibility, whereby the difference of thermal expansion coefficient between the electrode and hard insulator is effectively relaxed.

Examples of reaction gases used for forming the buffer layer comprising the above-mentioned amorphous silicon compound are, for example, a mixed gases of gas of silicon-containing compound such as $SiH_4$, $Si_2H_6$, $SiF_4$, $SiH_3F$ and $SiCl_4$ and gas of carbon-containing compound such as $CH_4$, $C_2H_4$, $CF_4$, $C_2H_2$, $C_6H_6$ and $C_6H_3F_3$, gas of nitrogen-containing compound such as $NH_3$, $N_2$ and $NF_3$, gas of Ge-containing compound such as $GeH_4$ and $GeF_4$, $O_2$ or $H_2O$. $H_2$, Ar, He, and the like are preferably used as dilution gas. $H_2$, $CH_4$, $SiH_4$ and $CF_4$ are particularly suitable for preparing amorphous silicone carbide.

Examples of the hard insulator used in the present invention are, for example, hard insulators having surface Vickers hardness of not less than 1000, preferably not less than 1500 such as diamond, diamond-like silicon carbide, amorphous silicon carbide, i-carbon film, cubic system-BN, hexagonal system-BN. These-hard insulators might be used individually but at least two kinds thereof might also be used at the same time.

In the case that the surface Vickers hardness of the coating comprising the above-mentioned hard insulator is less than 1000, the hard insulation coating is apt to be broken during the operation of electric discharge machining.

The surface hardness of the hard insulation coating is usually designed to be larger than that of the buffer layer, which is not always required. That is to say, if the surface hardness of the hard insulation coating in not less than 1000, it might not always be required that the surface hardness of the hard insulation coating is larger than that of buffer layer. In this case, the surface hardness of the hard insulation coating is determined in consideration of electrical insulation property and wear resistance.

Figure 5:
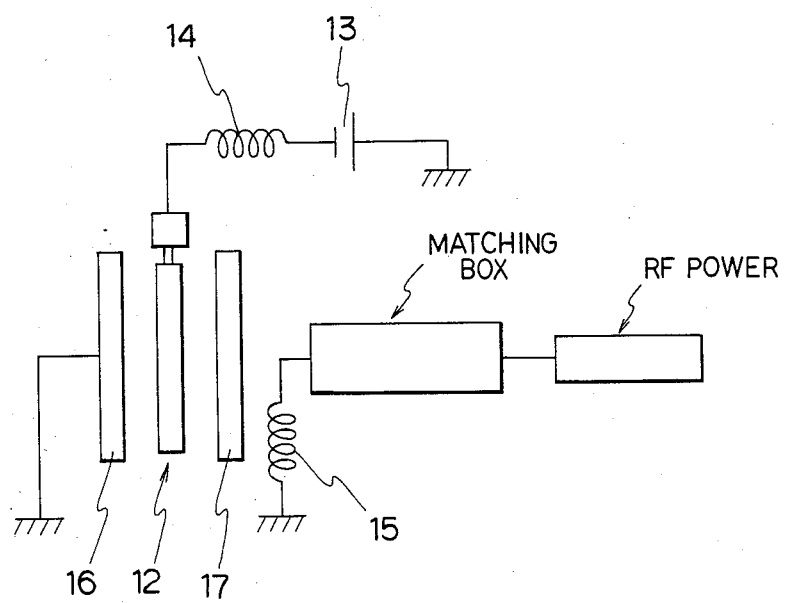
FIGS. 5 and 6 are views explaining a method for producing the electrode of the present invention respectively.

The method of forming the hard insulation coating 11 on the buffer layer 10 provided on the electrode 1 for electic discharge machining is not limited. The hard insulation coating 11 can be obtained, for example, by employing DC discharge plasma CVD, RF discharge plasma DVD method, mixed method of DC discharge plasma CVD method and RF discharge plasma CVD mehtod, and the like using $CH_4$, $SiH_4$, $C_2H_4$, $CF_4$, $C_6H_6$, $C_2H_2$, $H_2$, and the like as a reaction gas. The thickness of coating is preferably 1000 Å to 100 μm, more preferably 2000 Å to 20 μm. In this operation, if the electrode 12 itself is applied a negative high voltage as shown in FIG. 5 by DC power source 13 through RF choking coil in order to form a hard insulation coating by the mixed method of DC discharge plasma CVD method and RF discharge plasma CVD method, there can be obtained a coating having high hardness and bond strength, and superior wear resistance. In FIG. 5, numeral 15 is RF choking coil and numerals 16 and 17 are electrodes.

The total thickness of the coating of the present invention comprising the buffer layer and the hard insulation coating is usually 1050 Å to 105 μm, preferably 2000 Å to 20 μm. The conductivity of the total coating is preferably not more than $10^{-6}$ $(\Omega. cm)^{-1}$, and the dielectric breakdown voltage thereof is preferably not less than 10 V/μm, more preferably not less than 20 V/μm.

Next, a method of producing an electrode of the present invention is explained in accordance with an preferable embodiment.

A Cu-electrode for electric discharge machining is generally used as a electrode 1 for electric discharge machining. Examples of the size of the electrode 1 are, for example, 1 mm$^\phi\times$0.3 mm$^\phi\times$200 mm, 0.5 mm$^\phi\times$0.2 mm$^\phi\times$200 mm, 2 mm$^\phi\times$0.5 mm$^\phi\times$200 mm and 0.3 mm$^\phi\times$0.1 mm $^\phi\times$200 mm.

The Electron-beam vacuum evaporating coating method is usually employed as a method of forming the buffer layer in case that the buffer layer is made from, for example, Mo, Cr, and the like. It is not always necessary to heat the Cu-electrod for electric discharge machining. It is to be desired, if heating is carried out, that the heating temperature is not more than 100° C. at which Cu does not start to soften. The general evaporation velocity is about 0.5 to 5 Å/sec, and the general thickness of the buffer layer is about 1000 to 3000 Å.

In case of forming amorphous material layer such as amorphous silicon carbide as a buffer layer employing usual RF discharge plasma CVD method, the operation is carried out under the following conditions.

CH$_4$: 10 to 100 SCCM
SiH$_4$: 10 to 100 SCCM
H$_2$: 100 to 200 SCCM
RF power: 10 to 300 W (10 to 300 mW/cm$^2$)
Pressure in reaction chamber: 0.1 to 10 Torr The surface hardness of the coating obtained in accordance with the above-mentioned conditions is generally 400 to 1500. The coating made from amorphous silicon carbide, wherein a negative high voltage is applied to the electrode for electric discharge machining, is more suitable as a buffer layer of the present invention since the obtained coating has strong bond strength and fine or minute construction.

The buffer layer comprising amorphous silicon carbide is formed under the following conditions employing the appratus shown in FIG. 5.

| | |
|---|---|
| H$_2$ (reaction gas) | 50 to 200 SCCM |
| CH$_4$ (reaction gas) | 10 to 100 SCCM |
| SiH$_4$ (reaction gas) | 5 to 80 SCCM |
| Pressure in reaction chamber | 0.1 to 5 Torr |
| DC voltage | $-400$ to $-1000$ V |
| RF power | 2 to 30 W (2 to 30 mW/cm$^2$) |

The thickness of the coating is preferably 2000 Å to 2 μm. The Vickers hardness of the obtained coating is 1000 to 2000.

The obtained coating is used as a buffer layer and acordingly it is to be desired, that the Vickers hardness of the coating is not more than 1500 since the coating having large hardness is in danger of peeling If the layer (buffer layer) employed as an intermediate layer has surface Vickers hardness of not less than 1000, it goes without saying that such a layer can function as a coating layer. It is, however, preferrable that a material having Vickers hardness of 1500 to 1800 is coated on the intermediate layer to provide an electrode superior in working properties.

The hard insulation coating is formed by setting the electrode provided with the above-mentioned intermediate layer into, for example, an apparatus shown in FIG. 5. In case of forming a hard silicon carbide coating, the operation is carried out in accordance with the mixed method of DC discharge plasma CVD method and RF discharge plasma CVD method under the following conditions.

| | |
|---|---|
| H$_2$ (reaction gas) | 50 to 250 SSCM |
| CH$_4$ (reaction gas) | 5 to 60 SCCM |
| SiH$_4$ (reaction gas) | 5 to 60 SCCM |
| Pressure in reaction chamber | 0.1 to 5 Torr |
| DC voltage | $-200$ to $-2000$ V |
| RF power | 1 to 50 W (1 to 50 mW/cm$^2$) |

The Vickers hardness of the obtained coating is 1500 to 5000, and the conductivity resistance ratio thereof is not more than $10^{-12}$ $(\Omega\cdot cm)^{-1}$.

Instead of employing the method wherein a negative high voltage is applied to the electrode for electric discharge machining, the hard insulation coating can also be formed by a method wherein the mixed method of DC discharge plasma CVD method and RF discharge plasma CVD method is carried out with an apparatus having a magnetic field orthogonal to the electric field and maintaining electric field strength and magnetic field strength at suitable values.

In general, the hard coating can be obtained by diluting CH$_4$ and SiH$_4$ to low density with hydrogen, or adjusting the flow rate of CH$_4$ to be larger than that of SiH$_4$. It is required to diluted CH$_4$ and SiH$_4$ with hydrogen, to apply a higher negative voltage and to adjust the flow rate of SiH$_4$ to be larger than that of CH$_4$ in order to obtain crystalized silicon carbide layer.

The coeffiecient of friction of the obtained coating is generally 0.10 to 0.45. The coefficient of friction becomes smaller if CH$_4$ and SiH$_4$ are dilluted with hydrogen and the flow rate of CH$_4$ is adjusted to be larger than that of SiH$_4$. The conductivity of the coating is not more than $10^{-13}$ $(\Omega\cdot cm)^{-1}$ and the dielectric breakdown voltage is not less than 70 V/μm.

Referring now to Examples 1 to 6 and Comparative Examples 1 to 3, an electrode of the present inventon and a method of producing the electrode are explained.

EXAMPLES 1 TO 3

A plurality of hollow copper bars 8 supported by an insulator 7 were suspended betweeen an RF electrode 6 and a heater, 9 of a parallel-flat type glow discharge equipment as shown in FIGS 3A and 3B. The surface temperature of the bars 8 was elevated up to 300° C. in vacuo. After cleaning the surface of the bars, plasma cleaning was carried out using Ar gas for 1 to 10 minutes to improve adhesion of the bars. Next, silane and methane (1:2 by volume), silane and ammonia (1:1 by volume) and silane and nitrous oxide (1:2 by volume) which correspond to Examples 1 to 3 respectively were introduced to the equipment. Decomposition by glow discharge was carried out under a pressure of 0.1 to 2 Torr to form a-SiC (Example 1), a-SiN (Example 2) and a-SiO (Example 3) of which thickness were 1 to 10 μm. Al was further evaporated to evaluate the propeties of the coating. The dielectric breakdown voltages measured were all not less than 100 V/μm.

The working experiment, wherein the obtained electrode was attached to the actual electric discharge machine, was carried out, whereby there were shown that the obtained electrode had not less than five times of life compared with an electrode having no insulation coating, and superior working accuracy.

EXAMPLE 4 AND COMPARATIVE EXAMPLE 1

Mo was evaporated to form a coating of 1000 Å in thickness on a Cu-electrode for electric discharge machining of 1 mm in outer diameter (0.3 mm in inner diameter) at evaporation velocity of 1 Å/sec, employing Electron-beam vaccum evaporating coating method wherein heating was not carried out.

Figure 6:
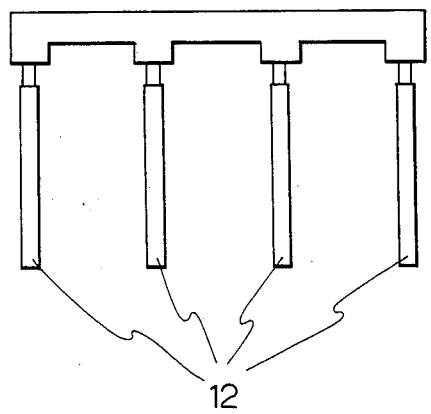

The electrode having a coating of Mo was set in the equipment shown in FIG. 6. FIG. 6 is a side view of the equipment wherein an electrode 12 for electric discharge machining having the buffer layer is set in a direction of the back of FIG. 5 as shown in FIG. 6. The electric potential of the electrode supplied with RF power source was electrically grounded with respect to DC together with an electrode 16 to be maintained 0.

The amorphous silicon carbide layer of 3 μm in thickness was formed under the following conditions.

| | |
|---|---|
| $H_2$ (reaction gas) | 150 SCCM |
| $CH_4$ (reaction gas) | 40 SCCM |
| $SiH_4$ (reaction gas) | 10 SCCM |
| Pressure in reaction chamber | 0.5 Torr |
| RF power | 2 W (2 mW/cm$^2$) |
| DC voltage | −900 V |
| Operation time | 2 hours |

The surface Vickers hardness of the obtained coating was 2500. The coefficient of friction of the obtained coating was 0.14. It was observed by X-ray diffraction analysis method that the coating included microcrystallized silicon carbide.

The silicon carbide coating could be formed even in the absence of the buffer layer, however, the obtained coating (Comparative Example 1) had small Vickers hardness (i.e. 2000), large coefficient of friction (i.e. 0.35) and insulation property. Moreover, there could not be obtained crystallized silicon carbide.

The coating which included microcrystallized silicon carbide was superior in bonding strength and stability thereof.

In case of employing the obtained electrode as an electrode for electric discharge machining, the coated electrode having Vickers hardness of 2500 was little exhausted, the strength of the coating was in good condition whereby dimensional accuracy of the workpiece could be improved.

EXAMPLE 5 AND COMPARATIVE EXAMPLE 2

A Cu-electrode for electric discharge machining of 1 mm in outer diameter (0.5 mm in inner diameter) was set in such an equipment as shown in FIG. 5 to obtain a buffer layer comprising a—$Si_xC_{l-x}H$ (wherein X satisfied the relationship of $0.01 \leq x \leq 1$) of 5000 Å in thickness under the following conditions.

| | |
|---|---|
| $H_2$ (reaction gas) | 100 SCCM |
| $CH_4$ (reaction gas) | 30 SCCM |
| $SiH_4$ (reaction gas) | 60 SCCM |
| Pressure in reaction chamber | 1 Torr |
| RF power | 10 W (10 mW/cm$^2$) |
| DC voltage | −300 V |

The peeling of the coating was apt to take place in case of high DC voltage, accordingly the formation of the coating was carried out by applying to the electrode smaller DC voltage than in the case of hard insulation coating of Example 4. The Vickers hardness of the obtained coating was 1500. But there could not be obtained sufficient insulation property with this obtained coating only.

Next, 2 μm of diamond-like carbon coating was formed on the obtained buffer layer under the following conditions.

| | |
|---|---|
| $H_2$ (reaction gas) | 150 SCCM |
| $CH_4$ (reaction gas) | 10 SCCM |
| Pressure in reaction chamber | 2 Torr |
| RF power | 50 W (50 mW/cm$^2$) |
| DC voltage | −600 V |

The surface Vickers hardness of the obtained coating was very large (i.e. 7000), and the coefficient of friction was very small (i.e. 0.10). The conductivity of the obtained electrode was not more than $10^{-13}$ $(\Omega \cdot cm)^{-1}$ and the dielectric breakdown voltage thereof was not less than 50 V/μm.

The actual use of the obtained electrode proved little exhaustion of the electrode and superior working accuracy.

In case of not forming a buffer layer (Comparative Example 2), the hard insulation coating was hard to be coated on the electrode due to the sputtering of Cu-electrode for electric discharge machining. The coating peeled off right away even if it was formed on the electrode.

EXAMPLE 6 AND COMPARATIVE EXAMPLE 3

A Cu-electrode for electric discharge machining of 1 mm in outer diameter (0.5 mm in inner diameter) was set in such an equipment as shown in FIG. 5 to obtain the buffer layer comprising a—$Si_xC_{l-x}$ (wherein X satisfied the relationship of $0.01 \leq x \leq 1$) of 1000 Å to 1 μm in thickness under the following conditions.

| | |
|---|---|
| $H_2$ (reaction gas) | 50 to 100 SCCM |
| $CH_4$ (reaction gas) | 10 to 50 SCCM |
| $SiH_4$ (reaction gas) | 5 to 20 SCCM |
| Pressure in reaction chamber | 0.1 to 5 Torr |
| RF power | 2 to 30 W (2 to 30 mW/cm$^2$) |
| DC voltage | −1 kV |

The peeling of the coating was apt to take place in case of high DC voltage, accordingly the formation of the coating was carried out by applying to the electrode smaller DC voltage than in the case of hard insulation coating of Example 4. The Vickers hardness of the obtained coating was 1500 to 2000. But there could not be obtained sufficient insulation property with this obtained coating only.

Next, 2 to 5 μm of diamond-like carbon coating was formed on the obtained buffer layer under the following conditions.

| | |
|---|---|
| $H_2$ (reaction gas) | 100 to 200 SCCM |
| $CH_4$ (reaction gas) | 10 to 60 SCCM |
| Pressure in reaction chamber | 0.1 to 10 Torr |
| RF power | 10 to 100 W (10 to 100 mW/cm$^2$) |
| DC voltage | −300 to −2000 V |

The surface Vickers hardness of the obtained coating was very large (i.e. 2000 to 8000), and the coefficient of friction was very small (i.e. 0.10 to 0.30). The conductivity of the obtained electrode was not more than $10^{-8}(\Omega \cdot cm)^{-1}$ and the dielectric breakdown voltage thereof was not less than 50 V/μm.

The actual use of the obtained electrode having a coating of which the surface Vickers hardness was 7000 and the electric conductivity was $10^{-13}(\Omega \cdot cm)^{-1}$ proved little exhaution of the electrode and superior working accuracy.

In the case of not forming a buffer layer (Comparative Example 3), the hard insulation coating was hard to be coated on the electrode due to the sputtering of Cu-electrode for electric discharge machining. The coating peeled off right away even if it was formed on the electrode.

As is obvious from the above-mentioned description, according to the electrode of the present invention, there is not taken place undesirable electric discharge between the electrode and workpieces on making holes or grooving since a part of the electrode, representatively a side portion thereof, is coated with non-single crystalline insulator.

Accordingly, the exhaustion of the electrode is avoided, the life of the electrode is extended and the dimensional accuracy can be extremely improved. There can be obtained sufficiently uniform coating having no drawbacks such as pinhole and crack in spite of its thickness of only about 1 μm. Further, the strain of the coating can be decreased since the coating is formed at not more than 500° C., whereby the life of the electrode can be further extended.

According to another electrode for electric discharge machining of the present invention, there can be obtained a coating having high hardness and small coefficient of friction since the electrode is coated with a buffer-layer and hard insulation coating in order, whereby the working accuracy can be further improved.

These electrode of the present invention can easily be obtained in accordance with the method of the present invention.

What is claimed is:

1. An electric discharge machining electrode comprising a conductive core and a non-single crystalline insulator disposed on at least a part of the surface of the electrode, said non-single crystalline insulator having a specific conductance of not more than $10^{-10}(\Omega \cdot cm)^{-1}$, a breakdown voltage of not less than 20 v/μm, and being selected form the group consisting of Si, $Si_xN_{l-x}$, $Si_{x+y}C_{l-x}N_{l-y}$, $Si_{x+y}C_{l-x}O_{l-y}$, $Si_{x+y}C_{l-x}Ge_{l-y}$, $C_xGe_{l-x}$ and combination thereof, wherein x and y satisfy the relationships $0.01 \leq X \leq 1$ and $0.01 \leq X+y \leq 1$.

2. The electrode of claim 1, wherein the non-single crystalline insulator further comprises at least one element selected from hydrogen and halogen group elements.

3. The electrode of claim 1, wherein the non-single crystalline insulator is a material including at least one element of group IV of periodic table.

4. The electrode of claim 1, wherein a thickness of the non-single crystalline insulator coated on the electrode is 1 to 10 μm.

5. The electrode of claim 1, wherein the non-single crystalline insulator is a material including at least one element of group IV of periodic table, and at least one element selected from hydrogen and halogen group elements.

6. An electric discharge machining electrode comprising a conductive core; a buffer material coated thereon, selected from the group consisting of metals having a small thermal expansion coefficient and amorphous material; and a hard insulator having a surface Vickers hardness of not less than 1000 coated on the buffer material.

7. The electrode of claim 6, wherein the hard insulator is diamond, diamond-like carbon, silicon carbide, amorphous silicon carbide, cubic system-BN or hexagonal system-BN.

8. The electrode of claim 6, wherein a total thickness of a coating comprising the buffer material and the hard insulator is 1050 Å to 105 μm.

9. The electrode of claim 6, wherein the specific conductive breakdown voltage of the electrode coated with the buffer material and the hard insulator are not more than $10^{-6}(\Omega \cdot cm)^{-1}$ and 20 V/μm respectively.

10. The electrode of claim 6, wherein the electrode core comprises brass, copper, aluminum, zinc alloy, graphite or silver-tungsten.

11. The electrode of claim 6, wherein said buffer material is a metal having small thermal expansion coefficient is Mo, Nb, Pt, Ti, W, Ni, Cr or stainless steel.

12. An electrode according to claim 6, wherein the amorphous material is selected from the group consisting of a—Si, a—Si$_x$C$_{l-x}$, a—Si$_x$N$_{l-x}$, a Si$_{xy}$C$_{l-x}$C$_{l-x}$N$_{l-y}$, a—Si$_{x+y}$C$_{l-x}$O$_{l-y}$, a—Si$_{x+y}$C$_{l-x}$Ge$_{l-y}$ and a—C$_x$G$_{l-x}$, and combinations thereof, wherein x and y satisfy the relationship of $0.01 \leq x \leq 1$ and $0.01 \leq x+y \leq 1$.

13. An electrode according to claim 12, wherein the amorphous material further comprises at least one element selected form the group consisting of hydrogen and halogen group elements.

14. The electrode of claim 6, wherein a thickness of the hard insulation is 50 Å to 5 μm.

15. A method of producing an electrode for electric discharge machining comprising coating at least a part of a surface of the electrode with a buffer material comprising a metal having a small thermal expansion coefficient or amorphous material; and further coating a hard insulator having surface Vickers hardness of not less than 1000 on the buffer material by a mixed method of DC discharge plasma CVD and RF discharge plasma applying a negative high voltage to the electrode.

* * * * *